R. L. TURNER.
Hand-Hoe.
No. 226,573.  Patented April 13, 1880.
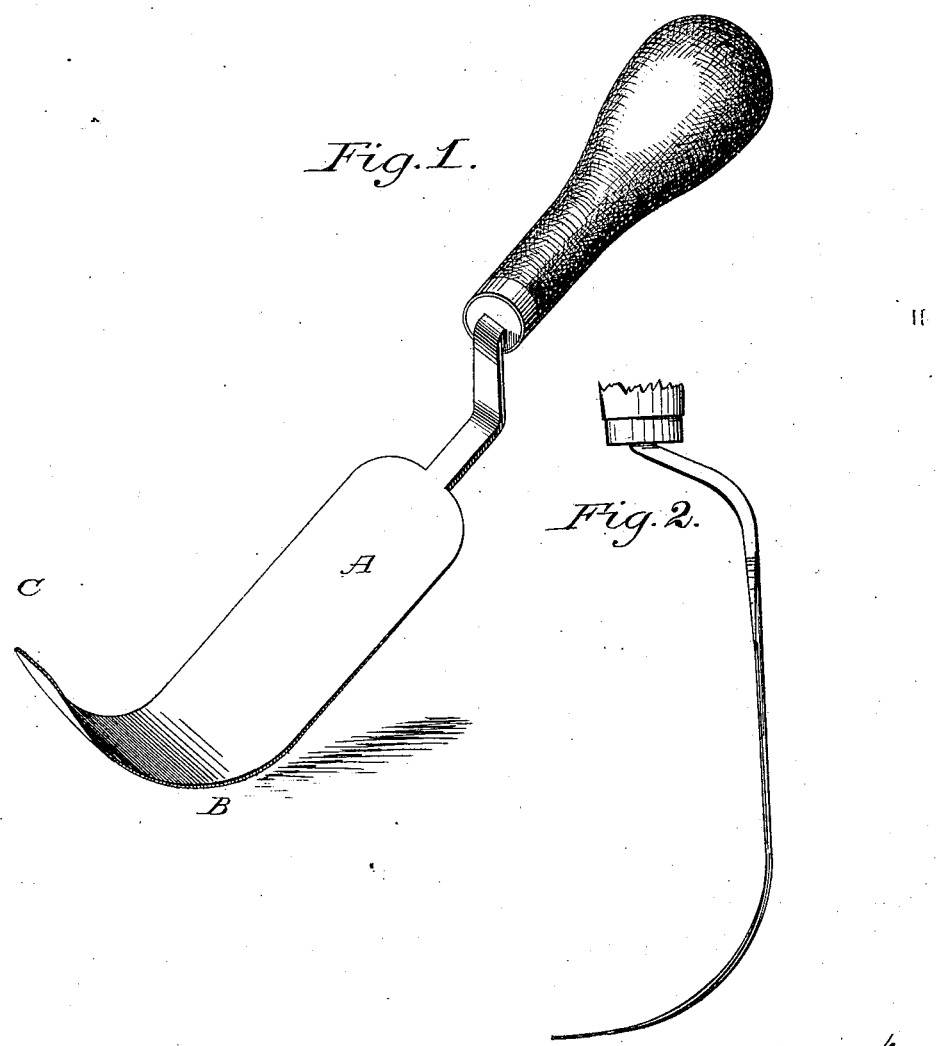
Witnesses:
Carlos Forbes
Amos S. Newman
Inventor:
Robert Leander Turner

UNITED STATES PATENT OFFICE.

ROBERT L. TURNER, OF OLENA, OHIO.

HAND-HOE.

SPECIFICATION forming part of Letters Patent No. 226,573, dated April 13, 1880.

Application filed April 22, 1879.

*To all whom it may concern:*

Be it known that I, ROBERT L. TURNER, of Olena, in the county of Huron and State of Ohio, have invented a new and Improved Hand-Hoe; and I do hereby declare that the following is a full, clear, and exact description of the same, reference being had to the accompanying drawings, forming part of this specification, in which—

Figure 1 is a perspective view, and Fig. 2 an edge view, of the blade.

My invention is an improved hand-hoe of that form in which a short handle carries a bent blade adapted to universal use in the cutting away of grass or manipulating the soil about plants; and it consists in the peculiar form of the blade, which is constructed of a main body portion setting off to one side of the longitudinal axis of the handle in a parallel plane therewith, and a curved or upturned end portion, which, as well as the main portion, is sharp upon both edges.

In the drawings, A B C represent the blade of my improved hoe, fastened in a short handle by a tang, in the usual way. This tang or shank as it leaves the handle is bent to one side, so that the main portion A of the blade is offset from line of the longitudinal axis of the handle in a plane parallel therewith. At the point B this blade bends upwardly toward the axial line of the handle again, and then continues in a more or less straight line to form an oblique working end, C.

I am aware of the patent to C. Mahan, granted September 10, 1867, in which a similar implement is shown. This differs radically from my invention, in that the main portion of the blade is not offset from the longitudinal axis of the handle in parallel position therewith.

I do not claim, broadly, the offsetting parallel blade, as this is a common feature in trowels; but when this offsetting parallel blade is turned up at the end, as shown, an implement capable of new and varied use is produced, for I am not only enabled to use the parallel blade for cutting, scraping, smoothing, and packing the earth about the plants without soiling the knuckles, but in raking dirt to the plant the offsetting blade and upturned end co-operate, in that the sharp edge of the blade cuts into the ground and guides the movement of the bent end in drawing the dirt to the plant, preventing, at the same time, the earth from turning out underneath the blade upon the opposite side of the same from the plant.

Having thus described my invention, what I claim as new is—

The hand-hoe consisting of a handle having the main portion of its blade offset from the longitudinal axis of the handle in a plane parallel therewith, and its end turned up at B C, substantially as shown and described.

ROBERT LEANDER TURNER.

Witnesses:
CARLOS FORBES,
ANSON S. NEWMAN.